3,847,871
POLYMERS AND COPOLYMERS OF 1-FERROCENYL-1,3-BUTADIENE

William D. Stephens, 8912 Willow Hill Drive SE.; and T. Chade Willis, 2020 Golf Road, Apt. 325, both of Huntsville, Ala. 35802; and Charles S. Combs, 669 Larkwood, Holland, Mich. 49423
No Drawing. Filed May 11, 1972, Ser. No. 252,390
Int. Cl. C08f 25/00
U.S. Cl. 260—63 BB                  16 Claims

ABSTRACT OF THE DISCLOSURE

Polymers and copolymers of 1-ferrocenyl-1,3-butadiene are disclosed which are useful as coatings to protect exposed surfaces in space vehicles, to protect rubber against sunlight, and to protect against ultraviolet and gamma radiation in general.

BACKGROUND OF THE INVENTION

Field of the Invention

This invention relates to a method of using ferrocene so as to take advantage of its unusual properties. Ferrocene is dicyclopentadienyl iron, the nucleus of which has been noted for its abilities to absorb ultraviolet radiation. This unusual property of ferrocene has caused widespread interest in utilizing the material as an additive in rubbery polymeric materials in order to stabilize these materials against degradation of physical properties caused by sunlight. In addition, the ferrocene nucleus is highly stable towards gamma radiation. As a result of these stabilizing properties, there has been much interest in the use of ferrocene and ferrocene compounds in coatings for space vehicles to protect exposed surfaces.

The use of ferrocene or ferrocene derivatives to achieve the objectives outlined above has been hampered by the high volatility of ferrocene and ferrocene derivatives. The result of this volatility is that when ferrocene is incorporated as an additive to polymeric materials, the high vapor pressure of the ferrocene causes the material to sublime out of the polymeric matrix thereby rendering the ferrocene or ferrocene derivative unavailable for stabilizing physical properties.

Description of the Prior Art

In general, the solution to the problem of retaining ferrocene in a polymeric matrix has been to not add ferrocene or ferrocene derivatives as additives, but rather to include the ferrocene nucleus in the polymeric material so that it is chemically bonded to the polymer chain and therefore cannot escape from the rubber or plastic product. In the past, numerous efforts have been made to find a monomer which can be polymerized, or copolymerized with a comonomer, without destroying the special properties which the comonomer would give to the final product. For instance, polymers of butadiene have certain highly desirable properties such as elongation and tensile strength. If the ferrocene unit is attached to a monomer which is used in a copolymerization of butadiene, it is possible that the physical properties of polybutadiene would be significantly impaired, unless the proper monomer is used. Thus, the use of the proper ferrocene-containing monomer is very important in achieving the desired properties.

Several polymers and copolymers of ferrocene derivatives have been prepared in the past. However, most of these polymers were either brittle solids, or were relatively insoluble and difficult to handle.

SUMMARY OF THE INVENTION

In general this invention relates to polymers and copolymers of ferrocene-containing monomers which are useful in a wide variety of applications. More specifically this invention relates to polymers of 1-ferrocenyl-1,3-butadiene and to copolymers of 1-ferrocenyl-1,3-butadiene with dienes, esters of acrylic acid, vinyl ketones, vinyl ethers, and vinyl ferrocene.

It is an object of the present invention to provide polymeric materials which have ferrocene incorporated in the polymer chemically bonded to the polymeric claim so that the disadvantages inherent in the use of ferrocene as an additive may be overcome.

It is a further object of this invention to provide liquid polymeric materials which contain the ferrocene nucleus chemically bonded to the polymer chain.

Another object of this invention is to provide polymeric materials which contain the ferrocene nucleus chemically bonded to the polymer chain, which polymers are soluble in various solvents and therefore easier to handle.

These, and other objectives of the present invention, are achieved through the use of 1-ferrocenyl-1,3-butadiene as a monomer and comonomer with other polymerizable materials.

These and other objectives will become more apparent to one skilled in the art from the following detailed description and examples.

DESCRIPTION OF THE PREFERRED EMBODIMENTS

One of the essential components of this invention is the 1-ferrocenyl-1,3-butadiene. This monomer is prepared by a two-step reaction sequence, the first step of which involves a Grignard reaction of allylmagnesium halide with ferrocene aldehyde. The reaction product after hydrolysis is 1-ferrocenyl-3-butene-1-ol. This alcohol is then dehydrated by stirring a benzene solution of the alcohol in the presence of aluminum oxide.

More particularly, a solution consisting of 240 grams of ferrocene aldehyde dissolved in 600 ml. of benzene is added dropwise to a stirred solution of 213 grams of allylmagnesium bromide in 1200 ml. of ether under reflux. Refluxing and stirring are continued for two hours after the addition is completed. The reaction mixture is then allowed to cool to room temperature and is poured into 800 ml. of a cold 10% solution of ammonium chloride in water containing 20 grams of sodium disulfate in order to eliminate the impurities in the Grignard reagent. The mixture is then filtered and the organic layer from the filtrate is evaporated yielding 219 grams of 1-ferrocenyl-3-butene-1-ol.

This reaction product is stirred with 2.2 kg. of acidic aluminum oxide (Ventron Acidic Alumina of Ventron Corporation) in 3.2 liters of benzene for one hour to dehydrate the alcohol. The aluminum oxide is then removed by filtration and 1-ferrocenyl-1,3-butadiene, a red solid, is recovered by evaporation of the solvent.

Polymers of 1-ferrocenyl-1,3-butadiene may be made by treating the monomer with an appropriate catalyst with solvent. Copolymers of 1-ferrocenyl-1,3-butadiene with dienes may be made by treating a mixture of the two monomers with an appropriate catalyst. Also, copolymers of 1-ferrocenyl-1,3-butadiene with esters of acrylic acid may likewise be prepared by treatment of a mixture of the monomers with or without solvent with a suitable polymerization catalyst. Furthermore, copolymers of 1-ferrocenyl-1,3-butadiene with vinyl ketones, vinyl ethers, and vinyl ferrocene may be made by treatment of a mixture of the two monomers with or without solvent with a suitable polymerization catalyst.

The following examples illustrate the preparation of the polymers and copolymers of the present invention.

EXAMPLE I

A polymer of 1-ferrocenyl-1,3-butadiene was prepared by dissolving the 1-ferrocenyl-1,3-butadiene in ethyl ether and then adding a trace of sulfuric acid as the catalyst. Instantaneous polymerization occurred at room temperature. The solvent was then evaporated and the product purified by washing, leaving a brittle yellow solid polymer of 1-ferrocenyl-1,3-butadiene which was soluble in methylene chloride. That the polymer actually resulted was proven by (1) thin layer chromatography and (2) evacuation under high vacuum.

Thin layer chromatography (TLC) is performed by dissolving a sample of the reaction product in a small amount of solvent in a test tube and placing a small spot of the solution on the bottom of a TLC plate. The plates used in this test were supplied by Brinkman Instruments Company and are MN Silica-gel S–HR/UV254 chromatographic plates, and the solvent was a mixture of hexane and acetone. Monomeric molecules, such as any unreacted (i.e. unpolymerized) 1-ferrocenyl-1,3-butadiene, are carried up the chromatographic strip as a single spot moving slightly behind the solvent front as it climbs the strip. When polymers are present, these materials are moved much more slowly, and usually appear as a continuous smear with a dark brown streak all the way from the origin up to approximately half the distance to the solvent front. Since the polymer molecular weights are significantly higher than the molecular weights of the monomers involved, the migration rates of the polymers would be expected to be much lower, and therefore these materials would not be found as high on the chromatographic plate. In addition, since the polymeric products are generally mixtures of molecules of different molecular weights the polymer appears as a smear, or a streak, rather than as a single spot as in the case of the monomer or simple low molecular weight compounds. The TLC plates were developed by exposure to an iodine atmosphere. The brittle yellow solid polymer of this example produced a chromatographic plate with a smear which proved that the polymerization had occurred.

Evacuation under high vacuum is performed by subjecting samples recovered from the polymerization reaction mixtures to a vacuum of less than one millimeter at a temperature of 100° C. Under these conditions, the lower molecular weight materials are sublimed and lost by evaporation into the cold trap in the vacuum system. Anything which is not lost by this process necessarily has a much higher molecular weight, and is therefore polymeric. The polymer of this example acted as expected under the vacuum, thereby proving that polymerization occurred.

The molecular weight of the resultant polymer was found to be 2,737 by vapor pressure osmometry.

The iron content of the resultant polymer was found to be 23.15% which corresponds closely to the theoretical value of 23.3%.

EXAMPLE II

A polymer of 1-ferrocenyl-1,3-butadiene was prepared by a different process. The monomer was dissolved in methylene chloride and cooled to −79° C. A trace amount of boron trifluoride etherate was added and the mixture was stirred for approximately 10 minutes. The catalyst was destroyed by the addition of ammonium chloride, whereupon the polymeric product was obtained by filtering the mixture, evaporating the solvents, dissolving the product in ethyl ether, and precipitating it with methanol. The product was a brittle yellow solid polymer of 1-ferrocenyl-1,3-butadiene which is soluble in methylene chloride and ethyl ether. Evacuation under high vacuum and TLC as described in Example I proved that a polymer actually formed.

The polymer had an iron content of 22.48%, and a molecular weight of 2,780.

EXAMPLE III

In a third process for polymerizing 1-ferrocenyl-1,3-butadiene 10 grams of the monomer, 10 ml. water, 0.2 g. potassium persulfate, and 0.5 g. sodium lauryl sulfate were combined and these ingredients were heated at 90° C. for four hours. The polymeric product was precipitated by the addition of a sodium chloride solution. The precipitate was dissolved in benzene and reprecipitated with methanol yielding a soluble yellow-orange solid polymer of 1-ferrocenyl-1,3-butadiene, the existence of which was proven by TLC and high vacuum evacuation as described in Example I.

The poly-1-ferrocenyl-1,3 - butadiene of this Example had a molecular weight of 2,814 and an iron content of 22.17%.

EXAMPLE IV

A copolymer of 1-ferrocenyl-1,3-butadiene and isoprene was prepared by adding 40 grams of each of the monomers, 1.6 grams of potassium persulfate, and 4.0 grams of sodium lauryl sulfate to 80 ml. of water. The mixture was stirred and heated at 90° C. for four hours. The reaction mixture was allowed to cool and then was extracted with benzene. A viscous (tar-like consistency) orange-red liquid polymer was obtained by precipitation with methanol. Evacuation under high vacuum and TLC as described in Example I proved that a copolymer formed.

The resultant copolymer had a molecular weight of 1,695.

An analysis of the iron content of the copolymer showed 20.2% iron as opposed to a homopolymer iron content of 23.3%. Therefore, the resultant polymeric product was comprised of approximately 86% 1-ferrocenyl-1,3-butadiene monomer and approximately 14% isoprene.

EXAMPLE V

A copolymer of 1-ferrocenyl-1,3-butadiene and butadiene was formed in this example. Butadiene (120 grams), 1-ferrocenyl-1,3-butadiene (40 grams), 4,4'-azobis-(4-cyanopentanoic acid) (13 grams), and dioxane (320 ml.) were stirred at 80° C. in a sealed bomb for four days. The solvent was removed in a vacuum and the product was precipitated from ethyl ether with methanol. The product was an orange-red liquid copolymer the existence of which was again proven by TLC and high vacuum evacuation, as described in Example I.

The molecular weight of the resultant copolymer was 3,200.

The chemical analysis of the copolymer showed 12.3% iron, a fact which indicates that a copolymer composed of about 50 weight percent 1-ferrocenyl-1,3-butadiene and about 50 weight percent butadiene was formed.

EXAMPLE VI

A copolymer of 1-ferrocenyl-1,3-butadiene and methyl acrylate was prepared by stirring methyl acrylate (10 grams), 1-ferrocenyl-1,3-butadiene (10 grams), 4,4'-azobis-(4-cyanopentanoic acid) (1.3 grams), and dioxane (80 ml.) under nitrogen for four days at 65 to 70° C. The dark red liquid polymeric product was obtained by precipitation from ether with methanol. TLC and high vacuum evacuation showed the existence of the copolymer as was done in Example I.

EXAMPLE VII

A copolymer of 1-ferrocenyl-1,3-butadiene and methyl vinyl ketone was formed by dissolving equal quantities of the two monomers in a six-fold volume of hexane. A trace of sulfuric acid was added to the mixture at 0° C. The reaction mixture was allowed to stand for five minutes and the solvent was evaporated yielding a red oily copolymer of 1-ferrocenyl-1,3-butadiene and methyl vinyl ketone, TLC and high vacuum evacuation showed the existence of the copolymer, as described in Example I.

EXAMPLE VIII

A copolymer of 1-ferrocenyl-1,3-butadiene and vinyl isobutyl ether was prepared. Equal amounts of 1-ferrocenyl-1,3-butadiene and vinyl isobutyl ether were dissolved in a six-fold volume of hexane. A trace amount of sulfuric acid was added to the mixture at 0° C. The mixture was then allowed to stand for approximately five minutes. The solvent was next evaporated yielding a viscous red copolymer of 1 - ferrocenyl-1,3-butadiene and vinyl isobutyl ether. TLC and high vacuum evacuation showed the existence of the copolymer, as described in Example I.

EXAMPLE IX

A copolymer of 1-ferrocenyl-1,3-butadiene and vinyl ferrocene was prepared by heating 20 grams of each of the monomers with 0.5 grams of potassium persulfate, 4 grams of sodium lauryl sulfate, and 80 ml. of water with 0.3 grams of acrylic acid at 100° C. for three hours. The reaction mixture was precipitated, washed, dissolved in ether, and reprecipitated with methyl alcohol, yielding a clear red-orange plastic polymer. TLC and high vacuum evacuation showed the existence of the copolymer as was described in Example I.

The resultant copolymer had a molecular weight of 1,236.

It is to be understood that the foregoing examples and description are for the purposes of illustration only, and that various changes may be made therein without departing from the spirit and scope of the invention.

What is claimed is:

1. As a composition of matter, homopolymers of 1-ferrocenyl-1,3-butadiene prepared by reacting 1-ferrocenyl-1,3-butadiene with a catalyst, in the presence of a solvent, at a temperature of from about —79° to 90° C., for a period of from about 1 minute to 4 hours.

2. As a composition of matter, copolymers of 1-ferrocenyl-1,3-butadiene and a comonomer selected from the group consisting of dienes, acrylic acid, vinyl ketones, vinyl ethers, and vinyl ferrocene, prepared by reacting 1-ferrocenyl-1,3-butadiene and a comonomer with a catalyst, in the presence of a solvent, at a temperature of from about 0° to 100° C., for a period of from about 5 minutes to 4 days.

3. The copolymers of claim 2 wherein the diene is isoprene.

4. The copolymer of claim 2 wherein the diene is butadiene.

5. The copolymer of claim 2 wherein the ester of acrylic acid is methyl acrylate.

6. The copolymer of claim 2 wherein the vinyl ketone is methyl vinyl ketone.

7. The copolymer of claim 2 wherein the vinyl ether is vinyl isobutyl ether.

8. The product produced by dissolving 1-ferrocenyl-1,3-butadiene in ethyl ether, adding sulfuric acid at room temperature, subsequently evaporating the ether, and purifying the product by washing.

9. The product produced by dissolving 1-ferrocenyl-1,3-butadiene in methylene chloride, cooling the mixture to —79° C., adding boron trifluoride etherate, stirring the mixture for 10 minutes, adding ammonium chloride, filtering the mixture, evaporating the methylene chloride, dissolving the product in ethyl ether, and precipitating it with methanol.

10. The product produced by combining 1-ferrocenyl-1,3-butadiene, water, potassium persulfate, and sodium lauryl sulfate; heating these ingredients at 90° C. for four hours; precipitating the product by the addition of sodium chloride; dissolving the precipitate in benzene; and reprecipitating the product with methanol.

11. The product produced by combining equal amounts of 1-ferrocenyl-1,3-butadiene and isoprene with potassium persulfate, sodium lauryl sulfate, and water; stirring the mixture; heating at 90° C. for four hours; cooling the reaction mixture; and extracting the product with benzene.

12. The product produced by combining butadiene, 1-ferrocenyl-1,3-butadiene, 4,4'-azobis-(4 - cyanopentanoic acid) and dioxane; stirring at 80° C. in a sealed bomb for four days; removing the solvent in a vacuum; and precipitating the product from ethyl-ether with methanol.

13. The product produced by stirring methyl acrylate, 1-ferrocenyl-1,3-butadiene, 4,4'-azobis-(4-cyanopentanoic acid), and dioxane under nitrogen for four days at 65 to 70° C.; and precipitating the polymeric product from ether with methanol.

14. The product produced by dissolving 1-ferrocenyl-1,3-butadiene and methyl vinyl ketone in hexane; adding sulfuric acid to the mixture at 0° C.; allowing the mixture to stand for 5 minutes; evaporating the solvent; and purifying the product by washing.

15. The product produced by dissolving 1-ferrocenyl-1,3-butadiene and vinyl isobutyl ether in hexane; adding sulfuric acid to the mixture at 0° C.; allowing the mixture to stand for 5 minutes; evaporating the solvent to yield the product; and purifying the product by washing.

16. The product produced by heating 1-ferrocenyl-1,3-butadiene, vinyl ferrocene, potassium persulfate, sodium lauryl sulfate, water, and acrylic acid at 100° C. for three hours; precipitating the mixture; washing the product; dissolving the product in ether; and reprecipitating the product with methyl alcohol.

References Cited

UNITED STATES PATENTS 3,063,974 11/1962 Pruett et al. _____ 260—80
3,350,369 10/1967 Rosenberg et al. _____ 260—80

LESTER L. LEE, Primary Examiner

U.S. Cl. X.R.

117—161 UZ, 161 UD; 260—45.75 C, 80 P, 80.3 R, 80.3 E, 86.1 R, 91.1 M